(12) United States Patent
Pike, Sr.

(10) Patent No.: US 11,208,352 B1
(45) Date of Patent: Dec. 28, 2021

(54) LITHIUM-TREATED CALCIUM ALUMINATE CEMENT (CAC)-BASED PRODUCTS, CONCRETES, AND RELATED TECHNIQUES

(71) Applicant: VHSC, LTD., Tortola (VG)

(72) Inventor: Clinton W. Pike, Sr., Montgomery, TX (US)

(73) Assignee: VHSC, LTD., Tortola (VG)

( * ) Notice: Subject to any disclaimer, the term of this patent is extended or adjusted under 35 U.S.C. 154(b) by 0 days.

(21) Appl. No.: 16/913,758

(22) Filed: Jun. 26, 2020

(51) Int. Cl.
| | |
|---|---|
| *C04B 28/02* | (2006.01) |
| *C04B 7/32* | (2006.01) |
| *C04B 7/24* | (2006.01) |
| *C04B 18/08* | (2006.01) |
| *C04B 28/06* | (2006.01) |
| *C04B 28/28* | (2006.01) |
| *C04B 7/52* | (2006.01) |
| *C04B 22/10* | (2006.01) |
| *C04B 103/00* | (2006.01) |

(52) U.S. Cl.
CPC ............ *C04B 28/021* (2013.01); *C04B 7/243* (2013.01); *C04B 7/32* (2013.01); *C04B 7/52* (2013.01); *C04B 18/081* (2013.01); *C04B 22/10* (2013.01); *C04B 28/06* (2013.01); *C04B 28/28* (2013.01); *C04B 2103/008* (2013.01)

(58) Field of Classification Search
CPC .. C04B 7/32; C04B 7/52; C04B 7/243; C04B 18/081; C04B 22/10; C04B 28/021; C04B 28/06; C04B 28/28; C04B 2103/008
See application file for complete search history.

(56) References Cited

U.S. PATENT DOCUMENTS

| | | | |
|---|---|---|---|
| 9,254,490 B2* | 2/2016 | Pike, Sr. | ................. C04B 28/04 |
| 9,676,668 B2* | 6/2017 | Pike, Sr. | .................. C04B 7/32 |
| 10,308,552 B2* | 6/2019 | Dubey | ................. C04B 12/005 |
| 2015/0175887 A1* | 6/2015 | Welker | .................... C04B 24/16 |
| | | | 264/321 |

* cited by examiner

*Primary Examiner* — Anthony J Green
(74) *Attorney, Agent, or Firm* — Hayes Soloway PC

(57) ABSTRACT

Lithium-treated calcium aluminate cement (CAC)-based products, concretes, and related techniques are disclosed. In accordance with some embodiments, a lithium-treated CAC mixture may be produced by intergrinding ground-down CAC, class C fly ash, a lithium compound, and a polycarboxylate material. In accordance with some embodiments, a cementitious material may be produced by intergrinding said lithium-treated CAC mixture with class C fly ash, sodium citrate, and a polycarboxylate material. In accordance with some embodiments, a concrete may be produced by mixing said cementitious material (including said lithium-treated CAC mixture) with rock, sand, and water.

29 Claims, 3 Drawing Sheets

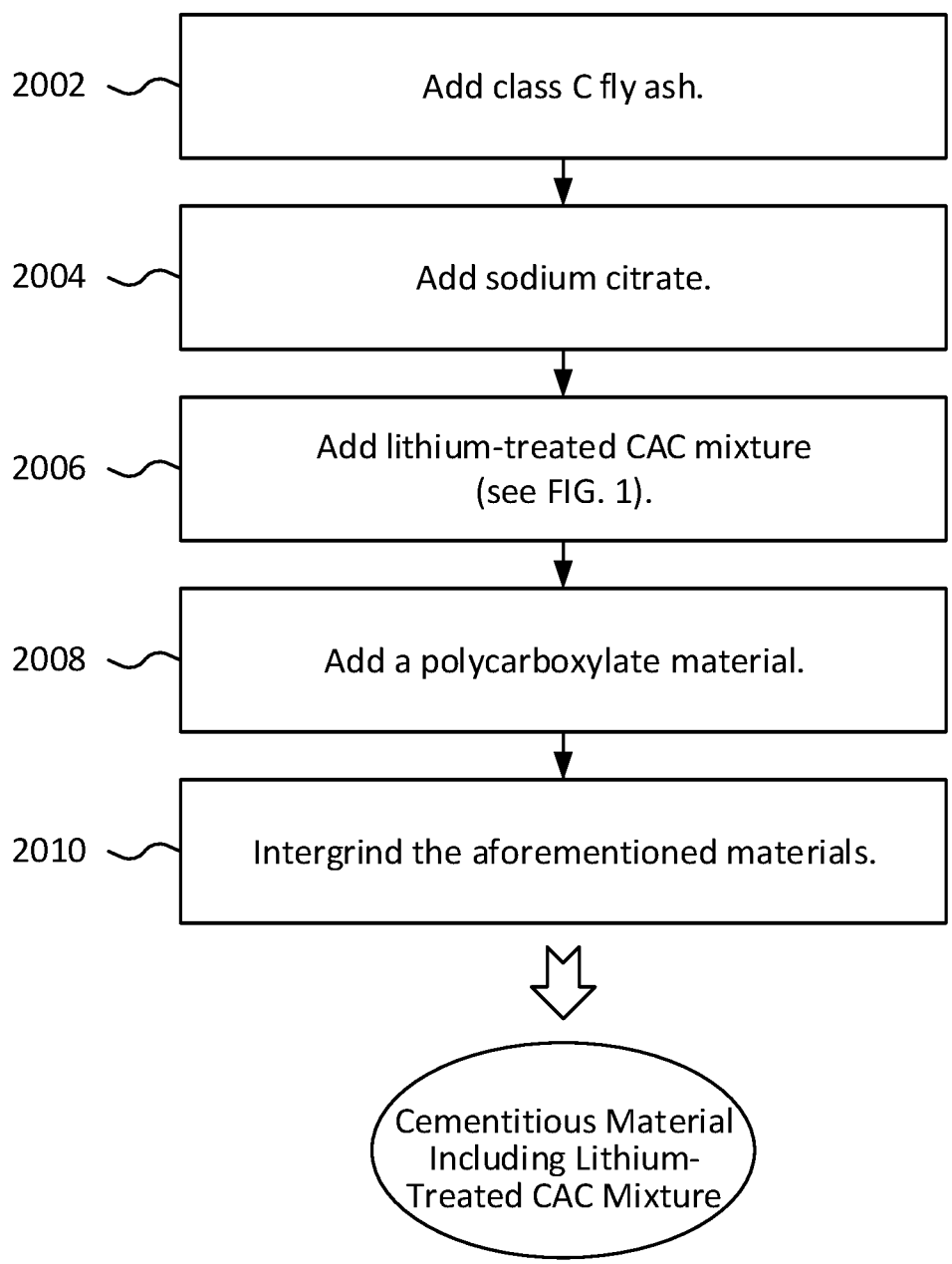

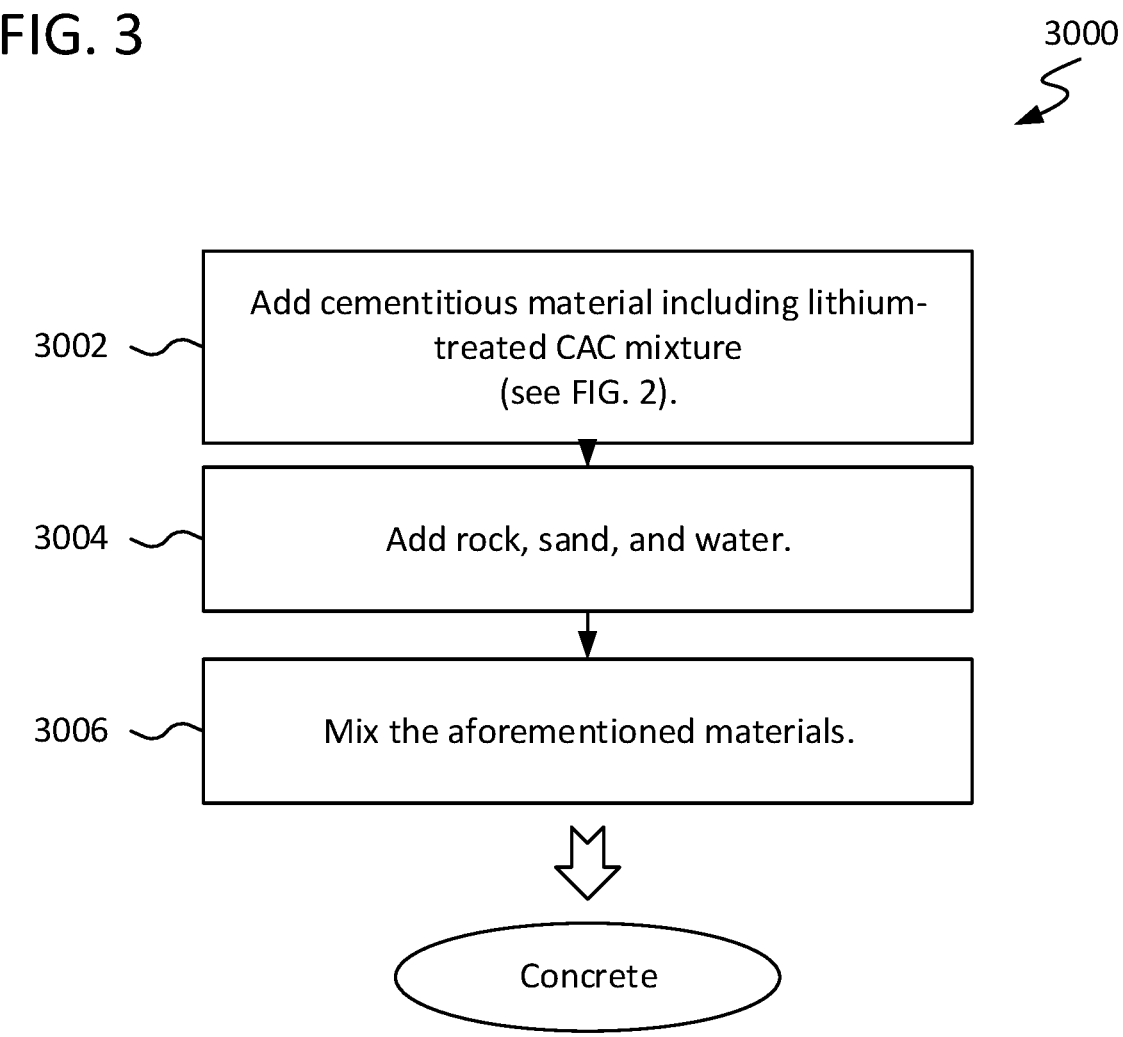

US 11,208,352 B1

LITHIUM-TREATED CALCIUM ALUMINATE CEMENT (CAC)-BASED PRODUCTS, CONCRETES, AND RELATED TECHNIQUES

FIELD OF THE DISCLOSURE

The present disclosure relates to cementitious materials and, more particularly, to fast-setting, high-early-strength cementitious materials and related techniques.

BACKGROUND

Calcium aluminate cements are hydraulic cements obtained by pulverizing a solidified melt or clinker that consists predominantly of hydraulic calcium aluminates formed from proportioned mixtures of aluminous and calcareous materials. Calcium aluminate cements can be used in high-early-strength and quick-setting applications.

SUMMARY

The subject matter of this application may involve, in some cases, interrelated products, alternative solutions to a particular problem, and/or a plurality of different uses of a single system or article.

One example embodiment provides a method including: producing a calcium aluminate cement (CAC)-based mixture including: calcium aluminate cement (CAC); a first amount of class C fly ash; a lithium compound; and a first polycarboxylate material.

In some cases, the CAC constitutes about 80-90 wt % of the CAC-based mixture. In some cases, the CAC has been ground down. In some instances, the CAC has been ground down so as to have a BET surface area increase of about 1-15% as compared to unground CAC. In some instances, the CAC has been ground down so as to have an average particle size in the range of about 20-35 µm.

In some cases, the first amount of class C fly ash constitutes about 10-20 wt % of the CAC-based mixture.

In some cases, the lithium compound constitutes about 0.01-0.3 wt % of the CAC-based mixture. In some cases, the lithium compound includes at least one of lithium chloride (LiCl), lithium carbonate ($Li_2CO_3$), lithium hydroxide (LiOH), and lithium citrate ($Li_3C_6H_5O_7$). In some cases, the lithium compound includes lithium chloride (LiCl). In some cases, the lithium compound includes lithium carbonate ($Li_2CO_3$).

In some cases, the first polycarboxylate material constitutes about 0.01-0.2 wt % of the CAC-based mixture.

In some cases, producing the CAC-based mixture involves intergrinding the CAC, the first amount of class C fly ash, the lithium compound, and the first polycarboxylate material. In some instances, the intergrinding is performed for about 30 minutes±10 minutes. In some instances, the intergrinding is performed until a D90 particle size distribution in the range of about 30-40 µm is achieved for the CAC-based mixture. In some instances, the intergrinding is performed utilizing a triethanol amine (TEA) grinding aid. In some such instances: the CAC-based mixture further includes the TEA grinding aid; and the TEA grinding aid constitutes about 0.01-0.1 wt % of the CAC-based mixture.

Another example embodiment provides a method including: producing a cementitious material including: a second amount of class C fly ash; sodium citrate; the CAC-based mixture produced as above; and a second polycarboxylate material.

In some cases, the second amount of class C fly ash constitutes about 70-90 wt % of the cementitious material.

In some cases, the sodium citrate constitutes about 5-7 wt % of the cementitious material.

In some cases, the CAC-based mixture constitutes about 10-25 wt % of the cementitious material. In some cases, the CAC-based mixture constitutes about 10-15 wt % of the cementitious material. In some cases, the CAC-based mixture constitutes about 15-25 wt % of the cementitious material.

In some cases, the second polycarboxylate material constitutes about 0.01-0.2 wt % of the cementitious material. In some cases, the second polycarboxylate material is of the same chemical composition as the first polycarboxylate material.

In some cases, producing the cementitious material involves intergrinding the second amount of class C fly ash, the sodium citrate, the CAC-based mixture, and the second polycarboxylate material. In some instances, the intergrinding is performed for about 10 minutes±5 minutes.

Another example embodiment provides a method including: producing a concrete including: the cementitious material produced as above; water; and at least one of rock and sand.

In some cases, the cementitious material constitutes about 8-15 wt % of the concrete. In some cases, the cementitious material constitutes about 15-25 wt % of the concrete.

In some cases, the water constitutes about 2-10 wt % of the concrete. In some cases, the concrete has a water-to-cement ratio in the range of about 0.25-0.4.

Another example embodiment provides a concrete produced as above.

Another example embodiment provides a concrete product including the concrete produced as above.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 2 illustrates a method of making a cementitious material including a lithium-treated CAC mixture in accordance with an embodiment of the present disclosure.

FIG. 3 illustrates a method of making a concrete in accordance with an embodiment of the present disclosure.

Figure 1:
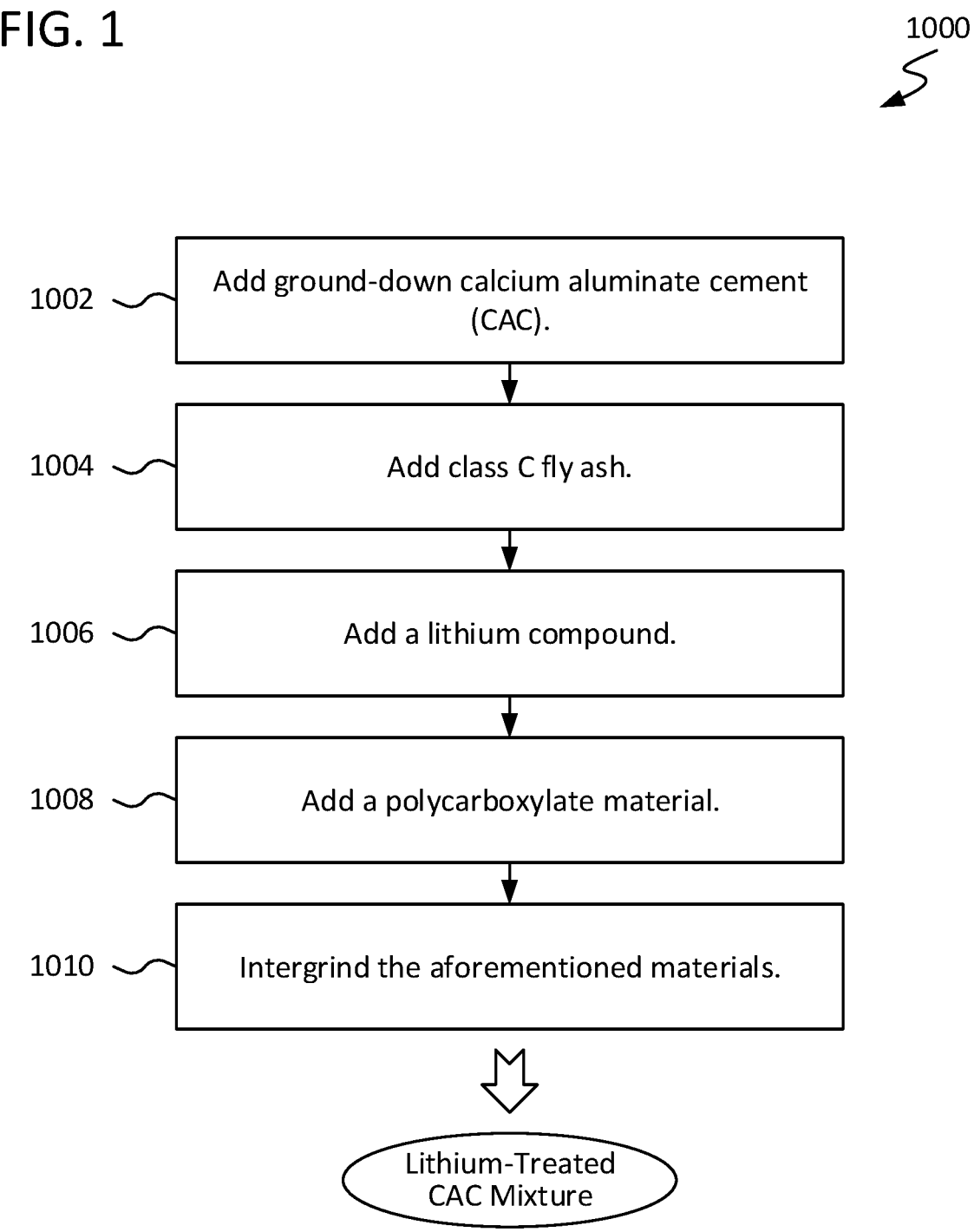
FIG. 1 illustrates a method of making a lithium-treated calcium aluminate cement (CAC) mixture in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Lithium-treated calcium aluminate cement (CAC)-based products, concretes, and related techniques are disclosed. In accordance with some embodiments, a lithium-treated CAC mixture may be produced by intergrinding ground-down CAC, class C fly ash, a lithium compound, and a polycarboxylate material. In accordance with some embodiments, a cementitious material may be produced by intergrinding said lithium-treated CAC mixture with class C fly ash, sodium citrate, and a polycarboxylate material. In accordance with some embodiments, a concrete may be produced by mixing said cementitious material (including said lithium-treated CAC mixture) with rock, sand, and water. Numerous variations will be apparent in light of this disclosure.

General Overview

In normal use, calcium aluminate cement (CAC) sets and gains strength like that of ordinary Portland cement (OPC). Concrete made with CAC and a lithium-based accelerator quickly sets and gains strength below freezing and is very heat-resistant. In recent years, however, the cost of CAC-based concrete has risen significantly. Consequently, various alternative ternary blends involving CAC have been developed in effort to lower costs while still taking advantage of the beneficial properties and performance of CAC. However, these ternary blends typically include other type(s) of cement and/or pozzolans and have stringent water-to-cement (w/c) ratio requirements to prevent the CAC from self-destructing.

Also, although geopolymer concrete presents an opportunity to reduce costs in providing a high-performance cement, products made therewith tend to suffer from reliability problems, failing to set and gain strength because of critical factors, such as temperature, during the initial cure. Moreover, variations of these products also have failed to repeat mix design concrete performance.

Thus, and in accordance with some embodiments of the present disclosure, lithium-treated calcium aluminate cement (CAC)-based products, concretes, and related techniques are disclosed. In accordance with some embodiments, a lithium-treated CAC mixture may be produced by intergrinding ground-down CAC, class C fly ash, a lithium compound, and a polycarboxylate material. In accordance with some embodiments, a cementitious material may be produced by intergrinding said lithium-treated CAC mixture with class C fly ash, sodium citrate, and a polycarboxylate material. In accordance with some embodiments, a concrete may be produced by mixing said cementitious material (including said lithium-treated CAC mixture) with rock, sand, and water.

In accordance with some embodiments, techniques disclosed herein may be utilized, for example, in producing a fast-setting, high-early-strength cementitious material that includes a lithium-treated CAC mixture. In some cases, a concrete produced as described herein may exhibit strengths of about 3,000 psi or greater within 3 hours. As will be appreciated, obtaining strengths meeting or exceeding a 3-hour/3,000 psi target is unusual, especially for concrete cubes produced and tested in accordance with ASTM C 989 protocols. In some cases, a concrete produced as described herein may exhibit strengths of about 8,000 psi or greater within 28 days. In at least some instances, a concrete produced via techniques disclosed herein generally may be considered a rapid repair concrete.

In accordance with some embodiments, a concrete produced as described herein may be poured at low temperatures (e.g., at an air temperature of 35-45° F. or lower) where ordinary concrete normally could not be poured. In at least some instances, a concrete provided as described herein may exhibit fast strength gains even at such lower temperatures and be very stable, allowing for rapid repair work even at such low temperatures. As will be further appreciated in light of this disclosure, the amount of lithium-treated CAC mixture may be varied to permit concrete pouring at temperatures below freezing. To that end, at least in some instances, a heated aggregate (e.g., at about 70° F. or so) optionally may be included in the concrete.

Lithium-Treated CAC Mixture

FIG. 1 illustrates a method 1000 of making a lithium-treated calcium aluminate cement (CAC) mixture in accordance with an embodiment of the present disclosure. As can be seen, method 1000 may begin as in block 1002 with adding ground-down CAC. The amount of ground-down CAC added may be customized, as desired for a given target application or end-use. In accordance with some embodiments, the ground-down CAC may constitute about 80-90 wt % (e.g., about 80-85 wt %, about 85-90 wt %, or any other sub-range in the range of about 80-90 wt %) of a given mixture produced according to method 1000.

In some instances, the CAC may have been ground down prior to beginning method 1000, though in other instances, the grinding down of the CAC may occur (at least in part) at one or more points during method 1000. The grinding down of the CAC may be performed utilizing any suitable grinding means, as will be apparent in light of this disclosure. For example, in accordance with some embodiments, grinding of the CAC may be performed (in part or in whole) utilizing a mill configured as disclosed in U.S. Pat. No. 9,254,490, titled "Process for Treating Fly Ash and a Rotary Mill Therefor," the entire disclosure of which is herein incorporated by reference.

In any case, the particle size distribution of the ground-down CAC may be customized, as desired for a given target application or end-use. For example, in some cases, the ground-down CAC may have an average particle size in the range of about 20-35 µm (e.g., about 20-25 µm, about 25-30 µm, about 30-35 µm, or any other sub-range in the range of about 20-35 µm). In some cases, the ground-down CAC may have a maximum particle size in the range of about 35-55 µm (e.g., about 35-45 µm, about 45-55 µm, or any other sub-range in the range of about 35-55 µm). In some cases, the ground-down CAC may have a minimum particle size in the range of about 5-20 µm (e.g., about 5-10 µm, about 10-15 µm, about 15-20 µm, or any other sub-range in the range of about 5-20 µm). Other suitable particle size ranges for the ground-down CAC will depend on a given target application or end-use and will be apparent in light of this disclosure.

As will be appreciated in light of this disclosure, the ground-down CAC may have an increased BET surface area as compared to unground CAC. For instance, the ground-down CAC may have a BET surface area which has been increased (as compared to unground CAC) by about 1-15% (e.g., about 1-5%, about 5-10%, about 10-15%, or any other sub-range in the range of about 1-15%). Other suitable surface area changes for the ground-down CAC will depend on a given target application or end-use and will be apparent in light of this disclosure. Also, as will be appreciated in light of this disclosure, the CAC material, in having been ground down as described, generally may be considered an activated CAC material, at least in some cases.

Method 1000 may continue as in block 1004 with adding class C fly ash. As will be appreciated in light of this disclosure, the class C fly ash may be sourced as desired for a given target application or end-use. In some cases, the class C fly ash may be sourced, in part or in whole, from a limestone power station, though such sourcing is not required. The amount of class C fly ash added may be customized, as desired for a given target application or end-use. In accordance with some embodiments, the class C fly ash may constitute about 10-20 wt % (e.g., about 10-15 wt %, about 15-20 wt %, or any other sub-range in the range of about 10-20 wt %) of a given mixture produced according to method 1000.

In any case, the particle size distribution of the class C fly ash may be customized, as desired for a given target application or end-use. For example, in some cases, the class C fly ash may have an average particle size in the range of about 10-20 µm (e.g., about 10-15 µm, about 15-20 µm, or any other sub-range in the range of about 10-20 µm). In some cases, the class C fly ash may have a maximum particle size in the range of about 50-90 µm (e.g., about 50-70 µm, about 70-90 µm, or any other sub-range in the range of about 50-90 µm). In some cases, the class C fly ash may have a minimum particle size in the range of about 1-5 µm (e.g., about 1-2.5 µm, about 2.5-5 µm, or any other sub-range in the range of about 1-5 µm). Other suitable particle size ranges for the class C fly ash will depend on a given target application or end-use and will be apparent in light of this disclosure.

Method 1000 may continue as in block 1006 with adding one or more lithium compounds. In general, the lithium compound may be any of a wide range of materials having a lithium cation which, when mixed with the ground-down CAC, facilitates setting and strengthening thereof. Some example suitable lithium compounds may include lithium chloride (LiCl), lithium carbonate ($Li_2CO_3$), lithium hydroxide (LiOH), and lithium citrate ($Li_3C_6H_5O_7$), among others. In some instances, a single lithium compound may be utilized, whereas in other instances, a combination of two or more different lithium compounds may be utilized. The amount of the lithium compound(s) added may be customized, as desired for a given target application or end-use. In accordance with some embodiments, the lithium compound(s) may constitute about 0.01-0.3 wt % (e.g., about 0.01-0.15 wt %, about 0.15-0.3 wt %, or any other sub-range in the range of about 0.01-0.3 wt %) of a given mixture produced according to method 1000.

In any case, the particle size distribution of the lithium compound(s) may be customized, as desired for a given target application or end-use. For example, in some cases, the lithium compound(s) may have an average particle size in the range of about 10-20 µm (e.g., about 10-15 µm, about 15-20 µm, or any other sub-range in the range of about 10-20 µm). In some cases, the lithium compound(s) may have a maximum particle size in the range of about 40-60 µm (e.g., about 40-50 µm, about 50-60 µm, or any other sub-range in the range of about 40-60 µm). In some cases, the lithium compound(s) may have a minimum particle size in the range of about 2-10 µm (e.g., about 2-6 µm, about 6-10 µm, or any other sub-range in the range of about 2-10 µm). Other suitable particle size ranges for the lithium compound(s) will depend on a given target application or end-use and will be apparent in light of this disclosure.

Furthermore, as will be appreciated in light of this disclosure, if the lithium compound(s) are hydroscopic (e.g., such as lithium chloride), then the inclusion of class C fly ash (block 1004) may help to prevent (or otherwise reduce) clumping thereof, in accordance with some embodiments.

Method 1000 may continue as in block 1008 with adding one or more polycarboxylate materials. In general, the polycarboxylate material may be any of a wide range of polycarboxylate heteropolymer or copolymer (i.e., made from two monomers) materials. In accordance with some embodiments, the polycarboxylate material may be a high-range water reducer. In some instances, a single polycarboxylate material may be utilized, whereas in other instances, a combination of two or more different polycarboxylate materials may be utilized. The amount of polycarboxylate material(s) added may be customized, as desired for a given target application or end-use. In accordance with some embodiments, the polycarboxylate material(s) may constitute about 0.01-0.2 wt % (e.g., about 0.01-0.1 wt %, about 0.1-0.2 wt %, or any other sub-range in the range of about 0.01-0.2 wt %) of a given mixture produced according to method 1000.

In accordance with a specific example embodiment, the polycarboxylate material may be a polycarboxylate copolymer, such as Polycarboxylate-PCX CAS NO. 59233-52-2, available from WEGO Chemical and Mineral Corporation of Great Neck, New York, (hereinafter, WEGO Polycarboxylate-PCX), described as a high-range water reducer. WEGO Polycarboxylate-PCX has the following general chemical structure, where (1) M, Y, and X are leaving groups, (2) $R^1$-$R^4$ are aliphatic carbon chains, (3) ethylene oxide (EO) is a hydrophilic component, and (4) propylene oxide (PO) is a hydrophobic component:

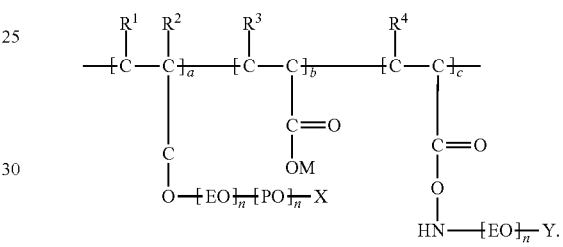

The hydrophilic EO component of WEGO Polycarboxylate-PCX has the following chemical structure:

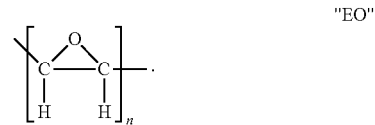

Also, the hydrophobic PO component of WEGO Polycarboxylate-PCX has the following chemical structure:

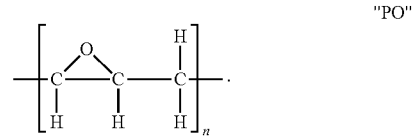

For WEGO Polycarboxylate-PCX, variables a, b, c, and n may be whole integers greater than or equal to 1, and carbon bonds omitted from the illustrated chemical structure of WEGO Polycarboxylate-PCX may be bonded with hydrogen (H). Furthermore, it should be noted that the M, Y, and X leaving groups are proprietary constituents not known outside of WEGO Chemical and Mineral Corp. Nevertheless, even without knowing the M, Y, and X leaving groups, a person having ordinary skill in the art can utilize techniques disclosed herein, including making use of WEGO's commercially available Polycarboxylate-PCX, to produce products, as variously described herein, in accordance with some embodiments of the present disclosure. Also, it should be noted that one or more polycarboxylate materials of chemistry similar to that of WEGO polycarboxylate-PCX may be utilized additionally or alternatively, in accordance with some embodiments.

Method 1000 may continue as in block 1010 with intergrinding the (1) ground-down CAC, (2) class C fly ash, (3) lithium compound(s), and (4) polycarboxylate material(s). The noted materials may be interground with one another (e.g., all at once or in one or more intermediate combinations) to provide a lithium-treated CAC mixture, in accordance with some embodiments. Intergrinding may be performed, in part or in whole, utilizing a mill with a grinding aid and media, in accordance with some embodiments. The specific type of mill may be customized, as desired for a given target application or end-use. In some cases, the mill may be, for instance, a rotary mill, such as a ball mill. In some cases, the mill may be configured, for example, as disclosed in U.S. Pat. No. 9,254,490 (incorporated by reference above).

Regarding the grinding aid, numerous suitable options may be utilized. In some cases, triethanol amine (TEA) may be utilized, though other suitable grinding aid(s) will be apparent in light of this disclosure. The amount of TEA may be customized, as desired for a given target application or end-use. In accordance with some embodiments, the TEA may constitute about 0.01-0.1 wt % (e.g., about 0.01-0.05 wt %, about 0.05-0.1 wt %, or any other sub-range in the range of about 0.01-0.1 wt %) of a given mixture produced according to method 1000. Regarding media, numerous suitable options may be utilized. In an example case, a 30% loading of a 50:50 mix of ¾" media and ½" media may be utilized, though other suitable media types, sizes, and combinations will be apparent in light of this disclosure.

The duration of the intergrinding of the materials related to method 1000 may be customized, as desired for a given target application or end-use. For example, in accordance with some embodiments, intergrinding may be performed for about 30 minutes (e.g., ±10 minutes). As will be appreciated in light of this disclosure, the intergrinding of materials may be performed, for example, until a given target particle size distribution is achieved, at least in some instances. For example, in some instances, intergrinding may occur until a D90 particle size distribution in the range of about 30-40 μm (e.g., about 30-35 μm, about 35-40 μm, of any other sub-range in the range of about 30-40 μm) is achieved. In some cases, intergrinding may occur until a D90 particle size distribution of about 34 μm (e.g., ±3 μm) is achieved. Other suitable durations and target particle size distributions for the materials associated with method 1000 will depend on a given target application or end-use and will be apparent in light of this disclosure.

Also, as will be appreciated in light of this disclosure, the intergrinding of the materials related to method 1000 may serve, at least in part, to control the amount of lithium compound(s) present per ton of total resultant powder blend. Moreover, the intergrinding may serve to smear lithium onto the increased BET surface area of the ground-down CAC present, in accordance with some embodiments.

Cementitious Material Including Lithium-Treated CAC Mixture

FIG. 2 illustrates a method 2000 of making a cementitious material including a lithium-treated CAC mixture in accordance with an embodiment of the present disclosure. As can be seen, method 2000 may begin as in block 2002 with adding class C fly ash. As will be appreciated in light of this disclosure, the description provided above, for instance, with respect to the characteristics of the class C fly ash related to block 1004 (of method 1000) may be equally or otherwise generally applicable here with respect to the class C fly ash related to block 2002 (of method 2000), in accordance with some embodiments. The amount of class C fly ash added may be customized, as desired for a given target application or end-use. In accordance with some embodiments, the class C fly ash may constitute about 70-90 wt % (e.g., about 70-80 wt %, about 80-90 wt %, or any other sub-range in the range of about 70-90 wt %) of a given mixture produced according to method 2000.

Method 2000 may continue as in block 2004 with adding sodium citrate ($Na_3C_6H_5O_7$). As will be appreciated in light of this disclosure, the combination of sodium citrate and class C fly ash may result in a geopolymer cement material, in accordance with some embodiments. The amount of sodium citrate added may be customized, as desired for a given target application or end-use. In accordance with some embodiments, the sodium citrate may constitute about 5-7 wt % (e.g., about 5-6 wt %, about 6-7 wt %, or any other sub-range in the range of about 5-7 wt %) of a given mixture produced according to method 2000.

Method 2000 may continue as in block 2006 with adding the lithium-treated CAC mixture produced via method 1000 (see FIG. 1). The amount of the lithium-treated CAC mixture added may be customized, as desired for a given target application or end-use. In accordance with some embodiments, the lithium-treated CAC mixture (produced via method 1000) may constitute about 10-25 wt % (e.g., about 10-15 wt %, about 15-20 wt %, about 20-25 wt %, or any other sub-range in the range of about 10-25 wt %) of a given mixture produced according to method 2000. In accordance with some embodiments, the lithium-treated CAC mixture may constitute about 10-15 wt % if the cementitious material including Li-treated CAC mixture (produced via method 2000) will be used in making concrete (see method 3000) in ambient temperatures of about 45° F. or higher. In accordance with some embodiments, the lithium-treated CAC mixture may constitute about 15-25 wt % if the cementitious material including Li-treated CAC mixture (produced via method 2000) will be used in making concrete (see method 3000) in ambient temperatures of about 45° F. or lower.

Method 2000 may continue as in block 2008 with adding one or more polycarboxylate materials. As will be appreciated in light of this disclosure, the description provided above, for instance, with respect to the characteristics of the polycarboxylate material(s) related to block 1008 (method 1000) may be equally or otherwise generally applicable here with respect to the polycarboxylate material(s) related to block 2008 (of method 2000), in accordance with some embodiments. In some cases, the polycarboxylate material(s) added at block 2008 (of method 2000) may be the same as the polycarboxylate material(s) added at block 1008 (of method 1000), though in other cases, different polycarboxylate material(s) may be utilized at blocks 1008 and 2008. The amount of polycarboxylate material(s) added may be customized, as desired for a given target application or end-use. In accordance with some embodiments, the polycarboxylate material(s) may constitute about 0.01-0.2 wt % (e.g., about 0.01-0.1 wt %, about 0.1-0.2 wt %, or any other sub-range in the range of about 0.01-0.2 wt %) of a given mixture produced according to method 2000.

Method 2000 may continue as in block 2010 with intergrinding the (1) class C fly ash, (2) sodium citrate, (3) Li-treated CAC mixture, and (4) polycarboxylate material(s). The noted materials may be interground with one another (e.g., all at once or in one or more intermediate combinations) to provide a cementitious material including a lithium-treated CAC mixture, in accordance with some embodiments. Intergrinding may be performed, in part or in whole, utilizing a mill with a grinding aid and media, in accordance with some embodiments. As will be appreciated in light of this disclosure, the description provided above, for instance, with respect to the mill, grinding aid, and media utilized in the intergrinding of materials related to method 1000 may be equally or otherwise generally applicable here with respect to the intergrinding of materials related to method 2000, in accordance with some embodiments. In some cases, any (or all) of the rotary mill, grinding aid, and media may be the same for method 2000 as those utilized, for example, in the intergrinding performed in method 1000, discussed above. In some other cases, however, a different rotary mill, grinding aid, and/or media may be utilized for intergrinding in method 2000 as compared to method 1000.

The duration of the intergrinding of the materials related to method 2000 may be customized, as desired for a given target application or end-use. For example, in accordance with some embodiments, intergrinding may be performed for about 10 minutes (e.g., ±5 minutes). As will be appreciated in light of this disclosure, the intergrinding of materials may be performed, for example, until a given target particle size distribution is achieved, at least in some instances. Other suitable durations for intergrinding the materials associated with method 2000 will depend on a given target application or end-use and will be apparent in light of this disclosure.

Also, as will be appreciated in light of this disclosure, the intergrinding of the materials related to method 2000 may serve, at least in part, to activate the class C fly ash. That is, the class C fly ash may have a BET surface area which has been increased (as compared to unground class C fly ash) by about 1-5% (e.g., about 1-2.5%, about 2.5-5%, or any other sub-range in the range of about 1-5%). Other suitable surface area changes for the class C fly ash will depend on a given target application or end-use and will be apparent in light of this disclosure. Moreover, the intergrinding may control the amount of sodium citrate present per ton of total resultant powder blend. Moreover, the intergrinding may serve to smear sodium citrate onto the increased BET surface area of the class C fly ash present, in accordance with some embodiments.

Concrete

FIG. 3 illustrates a method 3000 of making a concrete in accordance with an embodiment of the present disclosure. As can be seen, method 3000 may begin as in block 3002 with adding the cementitious material including Li-treated CAC mixture produced via method 2000 (see FIG. 2). The amount of cementitious material including Li-treated CAC mixture added may be customized, as desired for a given target application or end-use. In accordance with some embodiments, the cementitious material including Li-treated CAC mixture may constitute about 8-15 wt % (e.g., about 8-10 wt %, about 10-12 wt %, about 12-15 wt %, or any other sub-range in the range of about 8-15 wt %) of a given concrete produced according to method 3000. In accordance with some other embodiments, the cementitious material including Li-treated CAC mixture may constitute about 15-25 wt % (e.g., about 15-20 wt %, about 20-25 wt %, or any other sub-range in the range of about 15-25 wt %) of a given concrete produced according to method 3000.

Method 3000 may continue as in block 3004 with adding rock, sand, and water. In accordance with some embodiments, the rock material(s) may include, for example, ¾" limestone rock meeting ASTM C33 standards. In accordance with some embodiments, the sand material(s) may include, for example, screened sand meeting ASTM C33 standards. Other suitable types of rock and sand materials will depend on a given target application or end-use and will be apparent in light of this disclosure.

The amounts of rock, sand, and water added may be customized, as desired for a given target application or end-use. In accordance with some embodiments, the rock may constitute about 35-45 wt % (e.g., about 35-40 wt %, about 40-45 wt %, or any other sub-range in the range of about 35-45 wt %) of a given concrete produced according to method 3000. In accordance with some embodiments, the sand may constitute about 30-40 wt % (e.g., about 30-35 wt %, about 35-40 wt %, or any other sub-range in the range of about 30-40 wt %) of a given concrete produced according to method 3000. In accordance with some embodiments, the water may constitute about 2-10 wt % (e.g., about 2-6 wt %, about 6-10 wt %, or any other sub-range in the range of about 2-10 wt %) of a given concrete produced according to method 3000.

As will be appreciated in light of this disclosure, the water-to-cement (w/c) ratio for a concrete produced according to method 3000 also may be customized, as desired for a given target application or end-use. In some cases, the w/c ratio may be in the range of about 0.25-0.4 (e.g., about 0.25-0.3, about 0.3-0.35, about 0.35-0.4, or any other sub-range in the range of about 0.25-0.4). In some cases, the maximum w/c ratio may be in the range of about 0.25-0.38 (e.g., about 0.25-0.31, about 0.31-0.38, or any other sub-range in the range of about 0.25-0.38). In some cases, the minimum w/c ratio may be in the range of about 0.2-0.33 (e.g., about 0.2-0.26, about 0.26-0.33, or any other sub-range in the range of about 0.2-0.33). Other suitable w/c ratios for the materials associated with method 3000 will depend on a given target application or end-use and will be apparent in light of this disclosure.

Method 3000 may continue as in block 3006 with mixing the (1) cementitious material including Li-treated CAC mixture, (2) rock, (3) sand, and (4) water. The noted materials may be mixed with one another (e.g., all at once or in one or more intermediate combinations) to provide a concrete including a cementitious material including a lithium-treated CAC mixture, in accordance with some embodiments. Mixing may be performed as typically done with concrete products. Moreover, the duration of the mixing of the materials related to method 3000 may be customized, as desired for a given target application or end-use. As will be appreciated in light of this disclosure, it may be desirable to ensure that mixing is curtailed with sufficient time to provide for pouring, forming, etc., the concrete as desired.

Example Concrete Batch #1

In accordance with an example embodiment, a first example 8-sack concrete batch including the following constituent materials was made: (1) 705 lbs. of cementitious material including Li-treated CAC mixture, provided utilizing methods 1000, 2000 discussed above; (2) 1,587 lbs. of ¾" limestone rock meeting ASTM C33 standards; (3) 1,446 lbs. of screened sand meeting ASTM C33 standards; and (4) 248 lbs. (29.7 gal) of water. The w/c ratio of this batch was 0.33 (design: 0.35). The batch included 0.54 wt % air (design: 2.0 wt %). The designed unit weight of the batch was 147.63 lbs. with a specific gravity of 2.84.

The aforementioned cementitious material including Li-treated CAC mixture was mixed as follows: (1) 556 lbs. (78.9 wt %) class C fly ash; (2) 42 lbs. (6 wt %) sodium citrate; (3) 105 lbs. (15 wt %) Li-treated CAC mixture; and (4) 320 g (0.1 wt %) WEGO Polycarboxylate-PCX material.

The aforementioned Li-treated CAC mixture was mixed as follows: (1) 89 lbs. (84.7 wt %) ground-down CAC; (2) 16 lbs. (15 wt %) class C fly ash; (3) 72 g (0.15 Wt %) lithium chloride (LiCl); (4) 48 g (0.1 wt %) WEGO Polycarboxylate-PCX material; and (5) 24 g (0.05 wt %) TEA.

Table 1 below tabulates measured (a) surface temperatures and (b) strengths for several 6×12 cylinders of concrete poured from a volumetric truck and cured at an ambient temperature of about 73° F. in conditions meeting ASTM standards. The surface temperatures were taken on the concrete cylinders utilizing an infrared (IR) temperature gun. The strengths were obtained by breaking the cylinders.

TABLE 1

| Elapsed Time | Surface Temperature (° F.) | Strength (psi) |
| --- | --- | --- |
| 1 hr. | 101 | 2,560 |
| 2 hrs. | 108 | 3,290 |
| 3 hrs. | 108 | 3,240 |
| 1 day | — | 3,920 |
| 7 days | — | 6,530 |
| 28 days | — | 8,730 |

Example Concrete Batch #2

In accordance with an example embodiment, a second example 8-sack concrete batch including the following constituent materials was made: (1) 752 lbs. of cementitious material including Li-treated CAC mixture, provided utilizing methods 1000, 2000 discussed above; (2) 1,484 lbs. of ¾" limestone rock meeting ASTM C33 standards; (3) 1,543 lbs. of screened sand meeting ASTM C33 standards; and (4) 225 lbs. (27 gal) of water. The w/c ratio of this batch was 0.29 (design: 0.33). The batch included 1.52 wt % air (design: 2.0 wt %). The designed unit weight of the batch was 148.3 lbs. with a specific gravity of 2.38.

The aforementioned cementitious material including Li-treated CAC mixture was mixed as follows: (1) 423 lbs. (84.5 wt %) class C fly ash; (2) 27 lbs. (5.4 wt %) sodium citrate; (3) 50 lbs. (10.0 wt %) Li-treated CAC mixture; and (4) 227 g (0.1 wt %) WEGO Polycarboxylate-PCX material.

The aforementioned Li-treated CAC mixture was mixed as follows: (1) 254 lbs. (84.7 wt %) ground-down CAC; (2) 45 lbs. (15 wt %) class C fly ash; (3) 204 g (0.15 wt %) lithium chloride (LiCl); (4) 136 g (0.1 wt %) WEGO Polycarboxylate-PCX material; and (5) 68 g (0.05 wt %) TEA.

Table 2 below tabulates measured (a) surface temperatures and (b) strengths for several 4×8 cylinders of concrete poured from a volumetric truck and cured at an ambient temperature of about 68° F. in conditions meeting ASTM standards. The surface temperatures were taken on the concrete cylinders utilizing an infrared (IR) temperature gun. The strengths were obtained by breaking the cylinders.

TABLE 2

| Elapsed Time | Surface Temperature (° F.) | Strength (psi) |
| --- | --- | --- |
| 1 hr. | 92 | 2,317 |
| 2 hrs. | 85 | 2,973 |
| 3 hrs. | 78 | 3,405 |
| 1 day | — | 3,880 |
| 7 days | — | 6,287 |
| 28 days | — | 8,440 |

Example Concrete Batch #3

In accordance with an example embodiment, a third example 8-sack concrete batch including the following constituent materials was made: (1) 800 lbs. of cementitious material including Li-treated CAC mixture, provided utilizing methods 1000, 2000 discussed above; (2) 1,527 lbs. of ¾" limestone rock meeting ASTM C33 standards; (3) 1,393 lbs. of screened sand meeting ASTM C33 standards; and (4) 248 lbs. (29.8 gal) of water. The w/c ratio of this batch was 0.31 (design: 0.31). The batch included 1.38 wt % air (design: 2.0 wt %). The designed unit weight of the batch was 146.9 lbs. with a specific gravity of 2.35.

The aforementioned cementitious material including Li-treated CAC mixture was mixed as follows: (1) 676 lbs. (84.5 wt %) class C fly ash; (2) 43 lbs. (5.4 wt %) sodium citrate; (3) 80 lbs. (10 wt %) Li-treated CAC mixture; and (4) 363 g (0.1 wt %) WEGO Polycarboxylate-PCX material.

The aforementioned Li-treated CAC mixture was mixed as follows: (1) 68 lbs. (84.7 wt %) ground-down CAC; (2) 12 lbs. (15 wt %) class C fly ash; (3) 54 g. (0.15 wt %) lithium chloride (LiCl); (4) 36 g (0.1 wt %) WEGO Polycarboxylate-PCX material; and (5) 18 g (0.05 wt %) TEA.

Table 3 below tabulates measured (a) surface temperatures and (b) strengths for several 4×8 cylinders of concrete poured from a volumetric truck and cured at an ambient temperature of about 40° F. in conditions meeting ASTM standards. The surface temperatures were taken on the concrete cylinders utilizing an infrared (IR) temperature gun. The strengths were obtained by breaking the cylinders.

TABLE 3

| Elapsed Time | Surface Temperature (° F.) | Strength (psi) |
| --- | --- | --- |
| 1 hr. | 91 | 1,980 |
| 2 hrs. | 89 | 2,067 |
| 3 hrs. | 82 | 2,462 |
| 1 day | — | 3,940 |
| 7 days | — | 4,565 |
| 28 days | — | 8,979 |

ANALYSIS & CONCLUSIONS

The data of Tables 1-3 clearly show an increase in temperature (from ambient) within about 1-3 hours of elapsed time. Normally, the presence of sodium citrate would slow the cement reaction. However, the observed elevated temperatures generally indicate that the lithium-treated CAC, when mixed with sodium citrate-treated class C fly ash, still activates when exposed to water, with no retarding impact on the CAC from the citrate in solution. In fact, the elevated temperatures indicate that the activated lithium-treated CAC produces enough exothermic heat to (1) ensure that the reaction of the class C fly ash and sodium citrate occurs and (2) heat the entire mixture, thereby accelerating the strengthening of the concrete. In this manner, activated lithium-treated CAC acts as a sort of built-in jump start that helps the concrete gain strength quickly within at least the first 3 hours. Moreover, the lithium in solution may help the class C fly ash in reacting with calcium compounds in said fly ash that are solubilized and form the cement as it hydrates.

The data of Tables 1-3 also clearly show that lower ambient temperatures (e.g., about 40° F.) can impact the ability to achieve 3,000 psi in 3 hours. Nevertheless, even at such lower ambient temperatures, 28-day strength ratings still may come to exceed 8,000 psi.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A method comprising:
   producing a cementitious material comprising:
      a calcium aluminate cement (CAC)-based mixture comprising:
         calcium aluminate cement (CAC);
         a first amount of class C fly ash;
         a lithium compound; and
         a first polycarboxylate material;
      a second amount of class C fly ash;
      sodium citrate; and
      a second polycarboxylate material.

2. The method of claim 1, wherein the CAC constitutes about 80-90 wt % of the CAC-based mixture.

3. The method of claim 1, wherein the CAC has been ground down.

4. The method of claim 3, wherein the CAC has been ground down so as to have a BET surface area increase of about 1-15% as compared to unground CAC.

5. The method of claim 3, wherein the CAC has been ground down so as to have an average particle size in the range of about 20-35 µm.

6. The method of claim 1, wherein the first amount of class C fly ash constitutes about 10-20 wt % of the CAC-based mixture.

7. The method of claim 1, wherein the lithium compound constitutes about 0.01-0.3 wt % of the CAC-based mixture.

8. The method of claim 1, wherein the lithium compound comprises at least one of lithium chloride (LiCl), lithium carbonate ($Li_2CO_3$), lithium hydroxide (LiOH), and lithium citrate ($Li_3C_6H_5O_7$).

9. The method of claim 1, wherein the lithium compound comprises lithium chloride (LiCl).

10. The method of claim 1, wherein the lithium compound comprises lithium carbonate ($Li_2CO_3$).

11. The method of claim 1, wherein the first polycarboxylate material constitutes about 0.01-0.2 wt % of the CAC-based mixture.

12. The method of claim 1, wherein the second amount of class C fly ash constitutes about 70-90 wt % of the cementitious material.

13. The method of claim 1, wherein the sodium citrate constitutes about 5-7 wt % of the cementitious material.

14. The method of claim 1, wherein the CAC-based mixture constitutes about 10-25 wt % of the cementitious material.

15. The method of claim 1, wherein the CAC-based mixture constitutes about 10-15 wt % of the cementitious material.

16. The method of claim 1, wherein the CAC-based mixture constitutes about 15-25 wt % of the cementitious material.

17. The method of claim 1, wherein the second polycarboxylate material constitutes about 0.01-0.2 wt % of the cementitious material.

18. The method of claim 1, wherein the second polycarboxylate material is of the same chemical composition as the first polycarboxylate material.

19. The method of claim 1, wherein producing the cementitious material involves intergrinding the second amount of class C fly ash, the sodium citrate, the CAC-based mixture, and the second polycarboxylate material.

20. The method of claim 19, wherein the intergrinding is performed for about 10 minutes±5 minutes.

21. A method comprising:
    producing a concrete comprising:
       the cementitious material produced according to claim 1;
       water; and
       at least one of rock and sand.

22. The method of claim 21, wherein the cementitious material constitutes about 8-15 wt % of the concrete.

23. The method of claim 21, wherein the cementitious material constitutes about 15-25 wt % of the concrete.

24. The method of claim 21, wherein the water constitutes about 2-10 wt % of the concrete.

25. The method of claim 21, wherein the concrete has a water-to-cement ratio in the range of about 0.25-0.4.

26. A concrete produced according to claim 21.

27. A concrete product comprising the concrete of claim 26.

28. A method comprising:
    producing a calcium aluminate cement (CAC)-based mixture comprising:
       calcium aluminate cement (CAC);
       a first amount of class C fly ash;
       a lithium compound; and
       a first polycarboxylate material;
       wherein producing the CAC-based mixture involves intergrinding the CAC, the first amount of class C fly ash, the lithium compound, and the first polycarboxylate material; and
       wherein at least one of:
          the intergrinding is performed for about 30 minutes±10 minutes;
          the intergrinding is performed until a D90 particle size distribution in the range of about 30-40 µm is achieved for the CAC-based mixture; and
          the intergrinding is performed utilizing a triethanol amine (TEA) grinding aid.

29. The method of claim 28, wherein:
    the CAC-based mixture further comprises the TEA grinding aid; and
    the TEA grinding aid constitutes about 0.01-0.1 wt % of the CAC-based mixture.

* * * * *